United States Patent

Reinker, Jr.

[15] 3,645,567
[45] Feb. 29, 1972

[54] PUSH TOGETHER TUBE CONNECTOR

[72] Inventor: Joseph F. Reinker, Jr., Parma, Mich.

[73] Assignee: Aeroquip Corporation, Jackson, Mich.

[22] Filed: Feb. 24, 1970

[21] Appl. No.: 13,438

[52] U.S. Cl. ........................285/340, 285/348, 285/369, 285/DIG. 25
[51] Int. Cl. ........................................................F16l 17/00
[58] Field of Search..............285/13, 14, 369, DIG. 25, 348, 285/353, 354, 340, 349, DIG. 19; 137/583

[56] References Cited

UNITED STATES PATENTS

| 2,644,700 | 7/1953 | Woodling | 285/349 X |
| 3,425,717 | 2/1969 | Bruce | 285/340 X |
| 2,691,537 | 10/1954 | Boshurk | 285/340 |
| 3,405,957 | 10/1968 | Chakroff | 285/369 X |

FOREIGN PATENTS OR APPLICATIONS

| 1,104,741 | 6/1955 | France | 285/353 |

*Primary Examiner*—Dave W. Arola
*Attorney*—Jerry K. Harness

[57] ABSTRACT

A connector for coupling tube ends by pushing the ends into the connector. The assembly comprises a housing having two separable sections, an inner body insert within the housing into which the tube ends are pushed, from opposite sides, annular seals retained by the inner body insert and engaging the tube ends, and at least one outer body insert confining its adjacent seal and held in place by the housing. Partial separation of the housing sections will permit pressurized fluid in the connection to force the outer body insert away from the inner body insert, freeing the adjacent seal and permitting slow leakage. This will prevent a sudden spurt of fluid such as Freon from causing injury to the operator. Reconnection is obtained by reuniting the housing sections.

5 Claims, 3 Drawing Figures

Patented Feb. 29, 1972
3,645,567
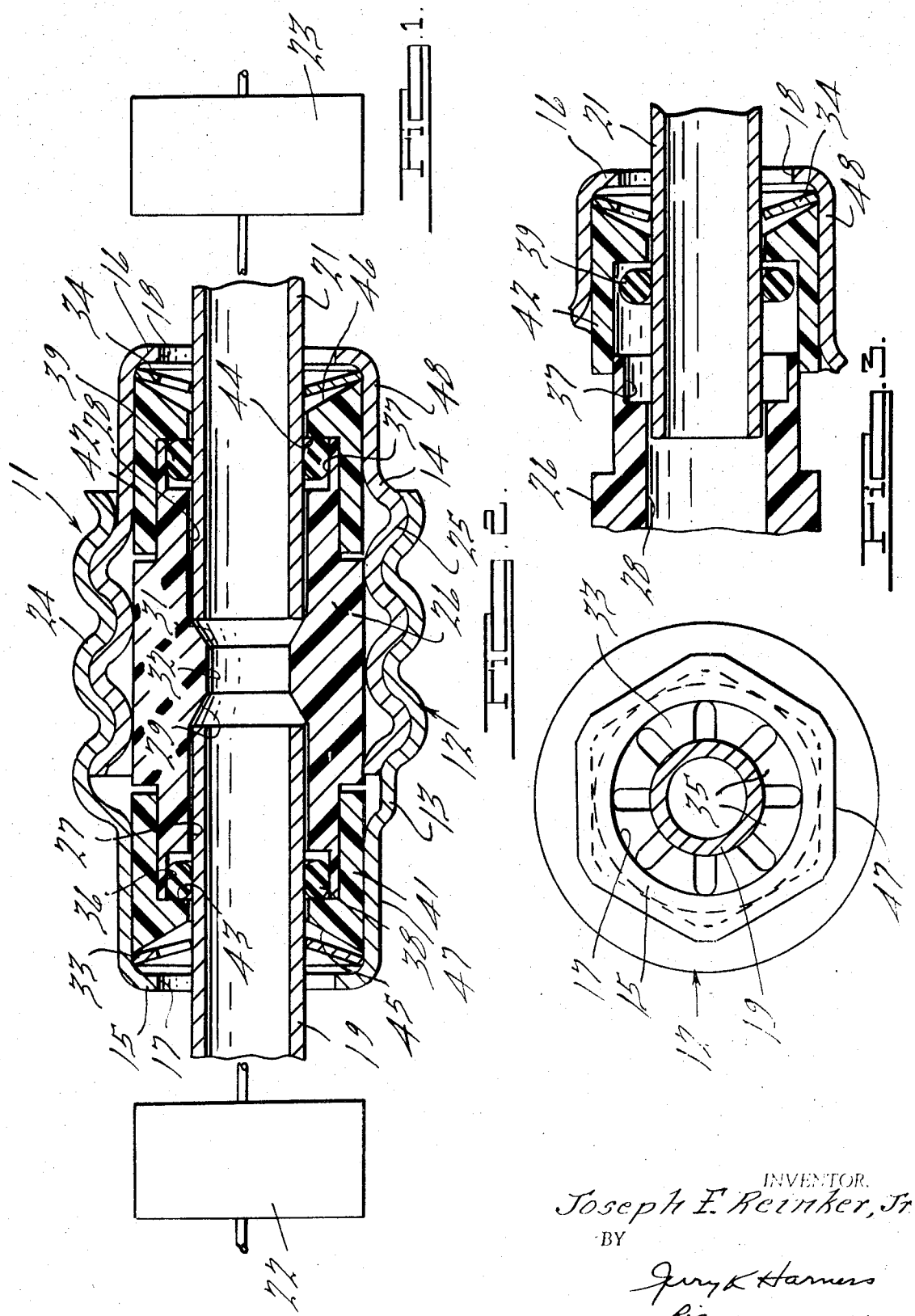
INVENTOR.
Joseph E. Reinker, Jr
BY
Jerry K Harness
his ATTORNEY

PUSH TOGETHER TUBE CONNECTOR

BACKGROUND OF THE INVENTION

1. Field of the Invention

The invention relates to tube connectors, and more particularly to connectors adapted to couple tube ends in a quick manner permitting uncoupling and recoupling for servicing or maintenance purposes. Such connectors are useful for example in coupling tubes extending from components of an automotive air-conditioning system, since such connections may have to be temporarily uncoupled from time to time for servicing purposes.

2. Brief Description of the Prior Art

Conventional connectors for this purpose have several drawbacks which it is an object of the present invention to overcome. In some cases the tube ends must be attached to the connector by time consuming operations, and it is difficult in many instances to uncouple and recouple the connector. The danger of a sudden release of fluid in the vicinity of an operator, causing possible injury, is another disadvantage of previous types of tube end connectors.

BRIEF SUMMARY OF THE INVENTION

According to the invention, a connector is provided having two mating housing sections which may be screwed together. An inner body insert is enclosed by these housing sections and has a pair of bores into which the tube ends may be inserted from opposite ends. The insert carries a pair of annular seals which engage the outer surfaces of the tubes, and the housings have spring grip washers which permit the tubes to be inserted but prevent their removal.

At least one outer body insert is provided, this member being held by a housing section and further confining the annular seal when the parts are in their assembled position. If it is desired to uncouple the connector, the housing sections are separated by unscrewing them, the tube ends being withdrawn from the inner body insert. Should pressure be present in the line, the seal adjacent the outer body insert will follow this member as partial unscrewing of the housing section occurs. This will free the annular seal from its confined position resulting in a slow leakage of fluid from the end. This will prevent possible harm to an operator which might otherwise occur with a sudden pressure release. The parts may be reassembled by replacing the outer body insert and seal on the inner body insert and screwing together the housing sections.

BRIEF DESCRIPTION OF THE DRAWING

FIG. 1 is a cross-sectional view in elevation taken along the line 1—1 of FIG. 2 and showing the connector with the tubes in their coupled position;

FIG. 2 is an end elevational view of a connector; and

FIG. 3 is a partial cross-sectional view showing one of the outer body inserts in its partially separated position so that the adjacent seal is unconfined.

DESCRIPTION OF THE PREFERRED EMBODIMENT

The connector is generally indicated at 11 and comprises a housing generally indicated at 12 having a pair of sections 13 and 14. These sections are of hollow construction, having end walls 15 and 16 respectively which have clearance apertures 17 and 18. The apertures are adapted to receive the ends of a pair of tubes 19 and 21 which may be connected to components such as 22 and 23 of an automotive air conditioning system.

The main portions of housing sections 13 and 14 have formed threads 24 and 25 respectively so that the sections may be screwed together or separated at will. An inner body insert 26 is disposed within the housing. This insert has a pair of bores 27 and 28 adapted to receive tubes 19 and 21 respectively. The bores terminate in sloping shoulders 29 and 31 which will limit the inward movement of the tubes when they are received by the insert. Bores 27 and 28 are interconnected by a central passage 32.

A pair of spring grip washers 33 and 34 are provided, these washers having inwardly extending fingers 35 adapted to grip tubes 19 or 21 when they are placed in insert 26. Springs 33 and 34 are held in position by end walls 15 and 16 respectively, and fingers 35 will be inclined toward the central portion of the connector and will grip the tube walls to prevent withdrawal thereof.

A pair of outwardly and downwardly open recesses 36 and 37 are formed in the opposite ends of insert 26 and retain seals 38 and 39 respectively. These seals are of annular shape and engage the outer surfaces of tubes 19 and 21 to prevent leakage. In the assembled position of the parts, seals 38 and 39 are held in position by a pair of outer body inserts 41 and 42. These members are slidably mounted on reduced portions of inner body insert 26 and have inwardly extending shoulders 43 and 44 which hold seals 38 and 39 in their respective recesses and in sealing relation with the tubes. The outer ends 45 and 46 of inserts 41 and 42 are of frustoconical shape to permit lifting of washers 33 and 34 by a suitable tool (not shown) whereby the tubes may be inserted without scarring their surfaces.

In operation, the connector parts may be coupled to their respective tubes 19 and 21 before they are assembled to each other, but normally, particularly where high production is involved, the connector will be preassembled before being attached to the tubes. The preassembled connector will include housing sections 13 and 14, inner body insert 26, seals 38 and 39, outer body inserts 41 and 42 and gripping washers 33 and 34. This assembly may be attached to tubes 19 and 21 by lifting grips 33 and 34 by the aforementioned tool and slipping the tubes into position as shown in FIG. 1. The tubes will be sealed to the connector by seals 38 and 39 which are confined between inner body insert 26 and the outer body inserts.

In order to uncouple the connector for servicing, housing sections 13 and 14 will be unscrewed from each other. For this purpose the ends 47 and 48 of housing sections 13 and 14 respectively are of hexagonal shape, thereby permitting a wrench to be applied thereto.

As the sections begin to separate, one or both of outer body inserts 41 and 42 will begin to move away from inner body insert 26. FIG. 3 shows insert 42 in its retracted position. This movement will take place because of the pressure within the line acting on seals 38 and 39. It will be evident from FIG. 3 that after seal 39 leaves the confines of its recess 37, fluid will be permitted to leak slowly around seal 39 and out through the annular space between insert 42 and tube 21 to the atmosphere. In this manner the danger of a sudden spurt of fluid which could injure the operator will be prevented.

Housing sections 13 and 14 may be left in their partially separated condition until all internal pressure has been released. After sections 13 and 14 have been completely detached from each other, any of the inserts 26, 41 and 42 may be removed together with seals 38 and 39 for servicing or replacement. Tubes 19 and 21 will continue to be connected to their respective housing sections 13 and 14 by washers 33 and 34.

To recouple the connector, the outer body inserts 41 and 42 together with seals 38 and 39 will be assembled to inner body insert 26. Tubes 19 and 21 will then be inserted in the inserts and through seals 38 and 39, while housing sections 13 and 14 are screwed together. It should be noted that during the coupling and uncoupling operations, it will be unnecessary to use any tool to separate spring grip washers 33 and 34 from the tubes.

It should be observed that although outer body inserts 47 and 48 are shown in the illustrated embodiment, only one is necessary to provide the desired slow leakage effect when the connector is uncoupled. In such case the other end of the inner body insert would be integrally formed to retain its seal.

What is claimed is:

1. In a push together tube connector, a housing having manually separable sections, and holding means to hold said sections together an inner body insert enclosed by said housing, clearance apertures in said housing sections and bores in said insert for receiving tube ends from opposite directions, gripping members within said housing engageable between the inserted tubes and said housing to prevent withdrawal of said gripping members and said tubes, a recess at each end of said insert, seals in said recesses engageable with the outer tube surfaces, and at least one outer body insert within said housing adjacent one of said ends thereof and slidable axially on said inner body insert, said outer body insert being held against said inner body insert by said housing and having a radially inwardly extending face engageable with the seal in the recess of said one of said ends of said inner body insert, the outer body insert being movable between a normal position confining its adjacent seal so that the latter may perform its sealing function, and a retracted position in which said seal is unconfined for sealing purposes so as to permit leakage of fluid to the atmosphere, said outer body insert being movable from its normal to its retracted position in response to pressure exerted on said seal when said housing sections are manually partially separated.

2. The combination according to claim 1, said holding means on said housing sections having interengaging threads formed thereon, parts of said sections having tool engageable surfaces whereby they may be unscrewed from each other.

3. The combination according to claim 1, said gripping members comprising washers of frustoconical shape and having inwardly extending fingers engaging said tube.

4. The combination according to claim 3, said holding means on said housing sections comprising interengaging threads formed thereon inwardly extending flanges at the ends of said members retaining said housing sections having said washers.

5. The combination according to claim 1, further provided with a second outer body insert mounted for axial movement at the other end of said inner body insert and movable between normal and retracted positions in the same manner as said first mentioned outer body insert.

* * * * *

UNITED STATES PATENT OFFICE
CERTIFICATE OF CORRECTION

Patent No. 3,645,567　　　　Dated February 29, 1972

Inventor(s) Joseph F. Reinker, Jr.

It is certified that error appears in the above-identified patent and that said Letters Patent are hereby corrected as shown below:

Column 4, line 11, "thereon inwardly extending flanges at the ends of said members retaining said housing sections having said washers." should read -- thereon, said housing sections having inwardly extending flanges at the ends of said members retaining said washers. --.

Signed and sealed this 24th day of October 1972.

(SEAL)
Attest:

EDWARD M. FLETCHER, JR.
Attesting Officer

ROBERT GOTTSCHALK
Commissioner of Patents